United States Patent [19]
Giorgianni et al.

[11] Patent Number: 5,267,030
[45] Date of Patent: Nov. 30, 1993

[54] METHOD AND ASSOCIATED APPARATUS FOR FORMING IMAGE DATA METRICS WHICH ACHIEVE MEDIA COMPATIBILITY FOR SUBSEQUENT IMAGING APPLICATION

[75] Inventors: Edward J. Giorgianni, Rochester; Thomas E. Madden, East Rochester, both of N.Y.

[73] Assignee: Eastman Kodak Company, Rochester, N.Y.

[21] Appl. No.: 931,889

[22] Filed: Aug. 17, 1992

Related U.S. Application Data

[63] Continuation of Ser. No. 455,541, Dec. 22, 1989.

[51] Int. Cl.$^5$ .............................................. H04N 1/46
[52] U.S. Cl. ..................................... 358/527; 358/518
[58] Field of Search .................. 358/75, 75 I, 75 J, 358/76, 78, 80

[56] References Cited

U.S. PATENT DOCUMENTS

| | | | |
|---|---|---|---|
| 4,037,249 | 7/1977 | Pugsley | 358/76 |
| 4,500,919 | 2/1985 | Schreiber | 358/78 |
| 4,583,186 | 4/1986 | Davis et al. | 364/526 |
| 4,734,763 | 3/1988 | Urabe et al. | 358/80 |
| 4,839,721 | 6/1989 | Abdulwahab et al. | 358/80 |
| 4,839,722 | 6/1989 | Barry et al. | 358/80 |
| 4,875,032 | 10/1989 | McManus et al. | 340/703 |
| 4,926,254 | 5/1990 | Nakatsuka et al. | 358/76 |
| 4,941,039 | 7/1990 | D'Errico | 358/80 |
| 4,945,405 | 7/1990 | Hirota | 358/75 |
| 4,958,220 | 9/1990 | Alessi et al. | 358/76 |
| 4,979,032 | 12/1990 | Alessi et al. | 358/76 |
| 5,038,866 | 10/1991 | Johnson | 358/75 |
| 5,157,506 | 10/1992 | Hannah | 358/298 |

FOREIGN PATENT DOCUMENTS 1369702 10/1974 United Kingdom .

*Primary Examiner*—David K. Moore
*Assistant Examiner*—Andrew W. Johns
*Attorney, Agent, or Firm*—Edward Dugas

[57] ABSTRACT

Methods and means are described for producing intermediary color image processing and/or data storage metrics that are independent of the input image origins. These methods and means produce intermediary metric images that can be output onto any of a plurality of image-receptive media or image-forming devices such that the reproduced images appear appropriately rendered for the output medium or device chosen regardless of the input image origin. The intermediary metric images may also be stored for later use without requiring documentation of their origin, images or portions thereof from various media and devices may be merged together to produce composite images of homogeneous and appropriate appearance, and images may be balanced and otherwise manipulated without requiring references to their origin.

34 Claims, 14 Drawing Sheets

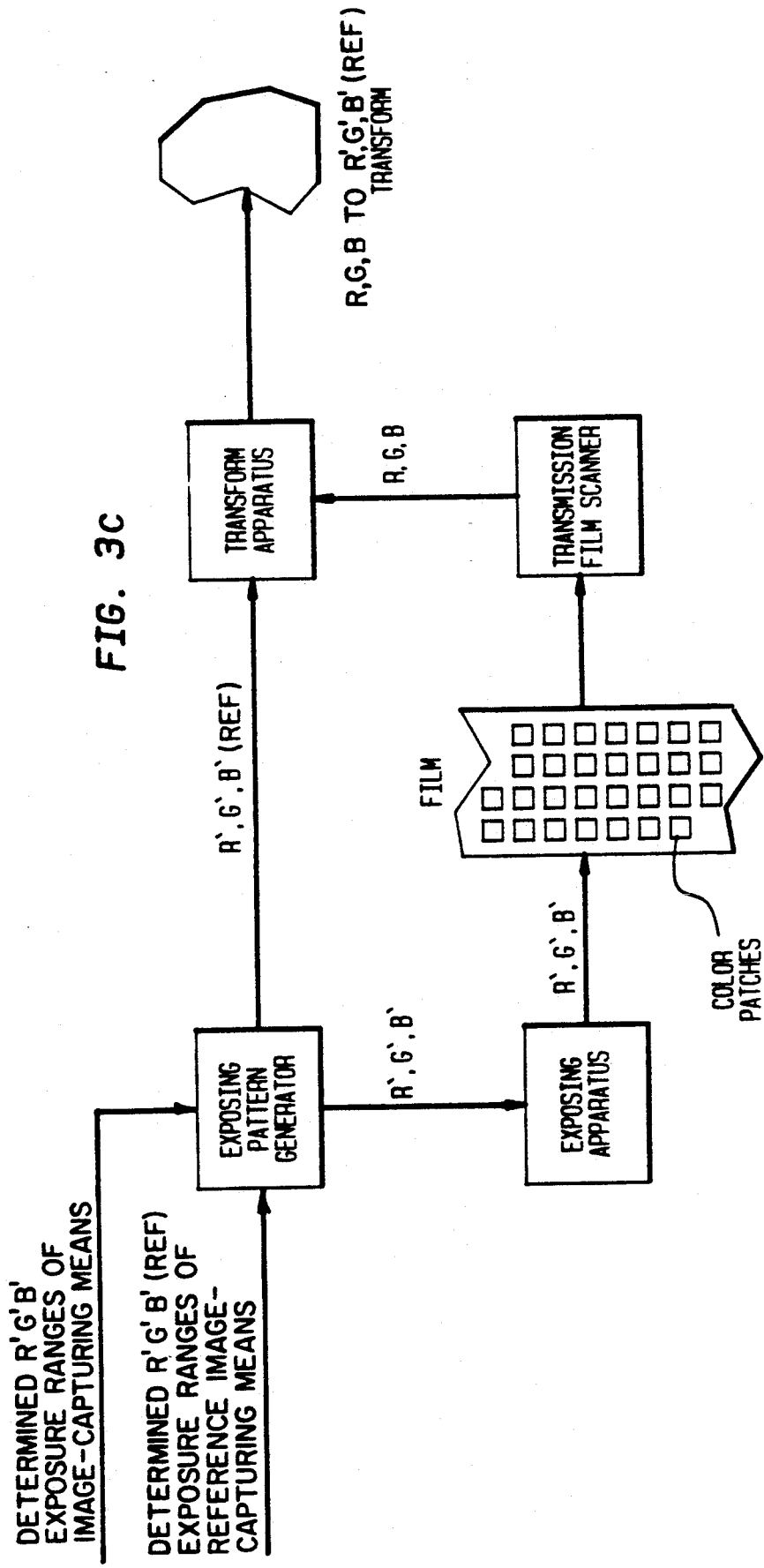

METHOD AND ASSOCIATED APPARATUS FOR FORMING IMAGE DATA METRICS WHICH ACHIEVE MEDIA COMPATIBILITY FOR SUBSEQUENT IMAGING APPLICATION

CROSS-REFERENCE TO RELATED APPLICATIONS

This application is continuation of U.S. patent application Ser. No. 445,541 filed Dec. 22, 1989, and entitled "METHOD AND ASSOCIATED APPARATUS FOR FORMING IMAGE DATA METRICS WHICH ACHIEVE MEDIA COMPATIBILITY FOR SUBSEQUENT IMAGING APPLICATIONS".

Reference is hereby made to U.S. Pat. No. 4,958,200 entitled COLOR IMAGING APPARATUS PRODUCING VISUALLY MATCHED DISPLAYS OF PERCEPTUALLY DISTINCT REPRODUCED IMAGES, filed in the P. Alessi et al on De. 27, 1988 and to U.S. Pat. No. 4,979,032 entitled COLOR IMAGING APPARATUS PRODUCING ON VARIOUS IMAGE-RECEPTIVE MATERIALS A VISUALLY MATCHED HARD COPY REPRODUCTION OF A VIDEO IMAGE DISPLAYED, filed in the names of P. Alessi et al on Dec. 27, 1988.

TECHNICAL FIELD OF THE INVENTION

This invention relates generally to color image reproduction apparatus and associated methods. More particularly, the invention relates to reproduction apparatus and associated methods for obtaining image data metrics which achieve compatibility for disparate imaging media used together for input, output, manipulation and/or storage.

BACKGROUND OF THE INVENTION

Color image reproduction systems known in the art permit images to be captured by certain image-receptive media or devices, possibly digitized and stored, and then output onto a complementary medium. So, for instance, color images may be first captured on negative film and then reproduced on negative photographic paper. Such images may or may not pass through a digital intermediary. In another case, color images may be captured on positive photographic materials, known as transparencies, and then viewed directly by projection or back-illumination, or copied onto larger or smaller transparencies, or printed onto positive photographic paper. Again, such images may or may not pass through a digital intermediary. In yet another case, color images may be captured as an electronic signal by a video camera, and then they may be viewed on a video monitor or converted to print by a device such as a thermal printer. And yet again, such images may or may not pass through a digital intermediary. The foregoing are just some examples of color image reproduction systems. The application of this invention is not limited to the above examples, but may be applied to other color imaging systems as well, for instance to the reproduction of reflection originals using photographic or electrostatic means.

Color-imaging systems in which the image passes through a digital intermediary allow improvements to be made to the image using a single means which may be a digital computer. Thus, improvements to the image's color and tone scale as well as its sharpness and noise can be made in a convenient and adaptable way. Furthermore, if combined with a means for rapid viewing of the changes, the content of the image can also be edited in a convenient fashion. Many of these types of improvements are known to those skilled in the art. For example, U.S. Pat. No. 4,500,919 entitled "COLOR REPRODUCTION SYSTEM" by W. F. Schreiber, discloses an image reproduction system of one type in which an electronic reader scans an original color image, which may be in the form of a transparency or print, and converts it to an electronic image. A computer workstation and an interactive operator interface, including a video monitor, permit an operator to edit the image by means of displaying it on the monitor. When the operator has composed a desired image on the monitor, the workstation causes the output writer device to make an inked output of the reproduced image.

A color imaging system of significantly greater value would have the ability to produce aesthetically pleasing and appropriately rendered reproductions of all digitized images using any of a plurality of image-receptive media or devices regardless of the original image origins. If this capability were incorporated in an imaging system, images originally captured on negative film, for instance, could be shown on a video monitor as well as be printed on negative or positive photographic films or papers. Likewise, images originally captured on positive film could be shown on a video monitor as well as be printed on negative or positive photographic films or papers. Additionally, images from various reflection media could be shown on a video monitor as well as be printed on negative or positive photographic films or papers, or video images could be printed onto negative or positive photographic films or papers. Furthermore any of these images could be printed using a thermal, ink-jet, or electrostatic printing means as well as many other means known in the art. In all cases, it would be desirable for the final printed or displayed images to appear aesthetically pleasing and appropriately rendered for the reproduction medium selected to produce and/or display the final image.

An improved color-imaging system would also provide the capability of storing digitized images for later display in such a manner that the display device, whether it produces hard copy using photographic paper, thermal dye transfer, electrostatic, or any other printing means, or a soft copy such as a video image, is not required to make any adjustments based on the original capture medium in order to make a pleasing reproduction of the image.

An improved color-imaging system would also provide the capability to mix portions of images digitized from various sources and still be able to reproduce a pleasing image using any of the various display means. For instance, one might wish to merge an object captured on one medium, such as positive transparency film, with an image captured on another medium, such as color negative film, and produce a single composite image on another medium, such as a video display, so that the entire image has a homogeneous and appropriate appearance.

Those skilled in the art will recognize the difficulties of successfully exchanging, storing, and producing homogeneous-appearing images of merged imaging data derived from disparate input and output media. Consider the problems associated with a color imaging system which utilizes highly dissimilar sources of input images, for example color negative and positive color transparency films. Digitized data from these two types of input films would be different in nature in that the densities of negatives increase as a function of increasing exposure while the densities of positive transparencies decrease as a function of increasing exposure. Furthermore, the contrasts of the two types of films may differ by a factor of three or more, the hues of the imaging dyes may be significantly different, the colored couplers normally incorporated in negative films produce a minimum density significantly different in both color and level from that of the transparency films, and the interlayer color-correction characteristics of the negatives are usually significantly different from those of transparencies. As a result, without special treatment, digitized data derived from a negative is inappropriate to use with output imaging devices designed to use digitized data from transparencies. Likewise, without special treatment, digitized data derived from a transparency is inappropriate to use with output imaging devices designed to use digitized data from negatives. Moreover, successful exchange, storage, and production of homogeneous-appearing images of merged imaging data is further complicated when other sources of input, such as reflection prints, electronic cameras, etc., are also considered.

Furthermore, in order to optimally display or reproduce color images it is often necessary to correct for variations in overall exposure and color balance due to exposure control errors of image capturing devices, variations in the color temperature of taking illuminant, and other factors. These balance adjustments are particularly important for an imaging system which has the previously described capability to merge portions of several images into a composite image. Different balance adjustments for each input image may be necessary in order to produce a homogeneous-appearing composite image. A practical color-imaging system should provide a convenient means to apply these balance adjustments. An improved color-imaging system would also provide this capability without requiring references to the input image origins.

Finally, it would be best if the capabilities of the color-imaging system to exchange, manipulate, store, and merge image data are provided in such a way as to preserve the unique advantages of each of the capture media. For example, among the advantages of a positive color transparency film is its dynamic range, which may exceed a transmittance ratio of 1000 to 1. Among the advantages of a negative film is its extensive latitude.

SUMMARY OF THE INVENTION

In view of the foregoing, an object of the present invention is to provide an improved color imaging system.

A further object of the present invention is to provide methods and means for improved calibration of color imaging systems.

A further object of the present invention is to provide methods and means for novel calibration of color imaging systems which achieve media compatibility for subsequent imaging applications.

A further object of the present invention is to provide methods and means for forming intermediary image data metrics such that images in said metrics can be output onto any of a plurality of image-receptive media or image-forming devices so that the reproduced images appear appropriately rendered for the output medium or device chosen regardless of the input image origin, images may be stored for later use without requiring documentation of their origin, images or portions thereof from various media and devices may be merged together to produce composite images of homogeneous and appropriate appearance, and images may be balanced and otherwise manipulated without requiring references to their origin.

To achieve these objects, the present invention provides for a method and means to arrive at an intermediary color image processing and/or storage metric which is independent of the image source. To that end, the red, green, and blue (RGB) image-bearing signals from a reflection or transmission scanner, or from an electronic imaging device are converted to an image manipulation and/or storage metric corresponding to the relative trichromatic exposure values that each image-capturing medium, system, or device received when it captured the original scene. Each image-bearing medium, system, or device calibrated according to the present invention would yield, insofar as possible, identical intermediary data values for captures of the same original scene.

The present invention also provides an alternative means to arrive at an intermediary color image processing and/or storage metric which is independent of the image source. To that end, the RGB image-bearing signals from a reflection or transmission scanner, or from an electronic imaging device are converted to an image manipulation and/or storage metric corresponding to the relative trichromatic exposure values that a reference image-capturing medium or device, of similar type to that which is being scanned or otherwise used as input, would have received if it had captured the original scene. Each reference image-bearing medium or device calibrated according to the present invention would yield, insofar as possible, identical intermediary data values for captures of the same original scene. Each image-bearing medium or device other than a reference uses the transformation of its corresponding reference medium, and would yield, insofar as possible, relative trichromatic exposure values differing from those of the reference medium such that the color reproduction differences between the image-bearing medium or device and the reference medium are maintained.

In cases where the intermediary data metric corresponds to relative trichromatic exposure values, the metric values can be further converted by taking their logarithms. By so doing, corrections for variations in overall exposure and color balance may be easily accomplished by additions and subtractions to the image data, and contrast changes may be done by multiplications. In addition, the nonlinear scaling of the logging operation generally provides for more efficient digital data storage.

The present invention provides for another alternative method and means to convert the RGB image-bearing signals from a reflection or transmission scanner, or from an electronic imaging device to an image manipulation and/or storage metric which corresponds to a measurement or description of a single reference image-recording device and/or medium and in which the metric values for all input media and devices correspond those which would have been formed by the reference device or medium had it captured the original scene under the same conditions under which the input media or devices captured that scene. For example, if the reference image recording medium was chosen to be a specific color transparency film, and the intermediary image data metric was chosen to be the measured scanner densities of that reference transparency film, then for an input color negative film, the RGB image-bearing signals from a scanner would be transformed not to the densities of the negative, but to the density values corresponding to those of an image which would have been formed by the reference transparency film had it been exposed under the same conditions under which the color negative was exposed. The selection of the intermediary image data metric can also be made so as to allow convenient manipulation of important imaging data. For example, if the metric values corresponded not to densities, but to colorimetric parameters corresponding to hue, saturation, and lightness, adjustments can be made directly to the intermediary image data to affect the corresponding perceived qualities of the image.

The present invention provides yet another alternative method and means to convert the RGB image-bearing signals from a reflection or transmission scanner, or from an electronic imaging device to an image manipulation and/or storage metric which corresponds to the trichromatic signals of a reference image-producing device such as a film or paper writer, thermal printer, video display, etc., and in which the metric values correspond to those which would be required to appropriately reproduce the color image on that device. For example, if the reference image producing device was chosen to be a specific video display, and the intermediary image data metric was chosen to be the RGB intensity modulating signals (code values) for that reference video display, then for an input film, the RGB image-bearing signals from a scanner would be transformed to the RGB code values corresponding to those which would be required to appropriately reproduce the input image on the reference video display.

It will be understood by those skilled in the art that these methods may not completely compensate for all differences, especially those inherent to differences in the spectral sensitivity characteristics, of all image-capturing media and devices. Nevertheless, using the described image metrics, images from any medium or device may be appropriately rendered on another medium or device without requiring documentation of their origins, images may also be stored for later use without requiring documentation of their origins, and images or portions thereof may be merged together to produce composite images of homogeneous and appropriate appearance.

BRIEF DESCRIPTION OF THE DRAWINGS

The invention will be described with reference to the accompanying drawings, wherein:

FIGS. 3A, 3B, and 3C, further illustrate in block diagram form variants of the first embodiment of the invention.

DETAILED DESCRIPTION OF PREFERRED EMBODIMENTS

Throughout the following description the terms device and medium are used interchangably.

Figure 1:
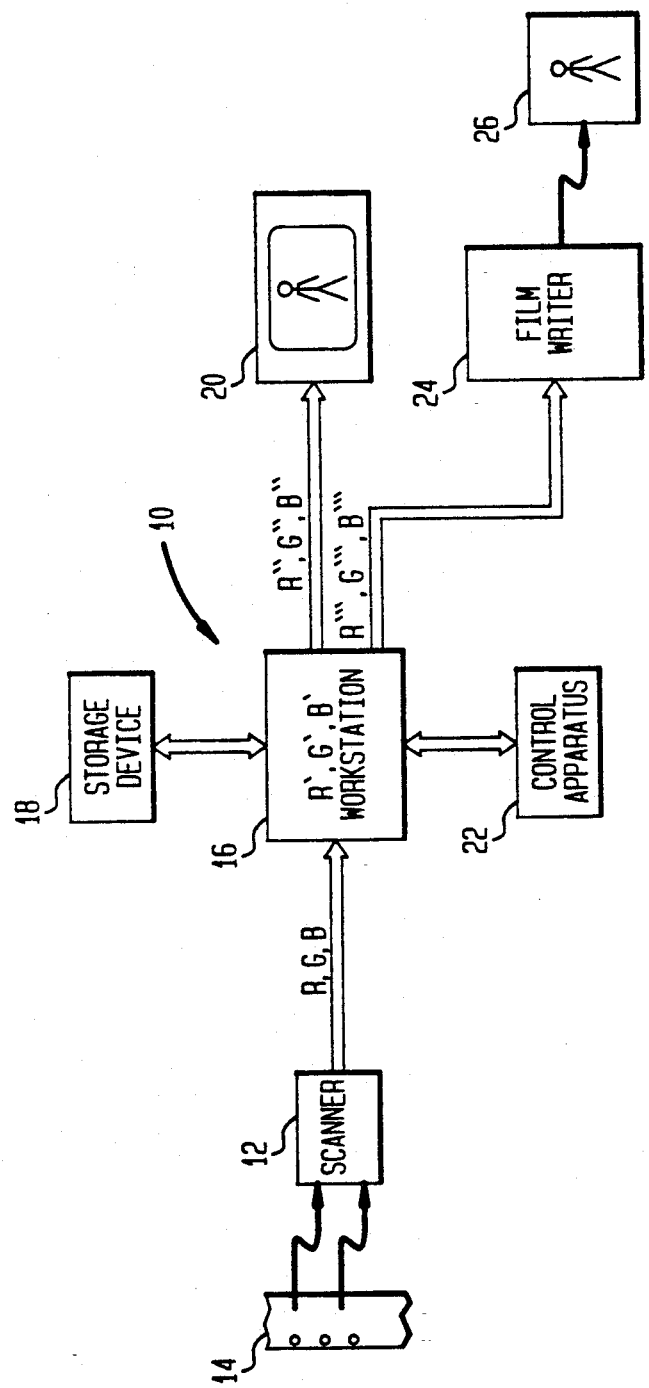
FIG. 1 is a block diagram of color reproduction apparatus in accordance with the teachings of the invention.

FIG. 1 shows, in block diagram form, color image reproduction apparatus 10, in accordance with a preferred embodiment of the invention. An image scanner 12, serves for scanning an original image on positive or negative photographic film 14, and for producing R, G, B (red, green, and blue) image-bearing signals in digital form for each picture element of the image being scanned. A scanner of the reflection type may also be used to scan original reflection-copy images. Image-bearing signals may also correspond to images captured by electronic means such as cathode-ray-tube (CRT) and charge-coupled-device (CCD) based video cameras or images from electronic image storage devices and media. A computer-based workstation 16, which receives the image-bearing signals from the scanner or electronic source transforms the input image-bearing signals into an intermediary image data metric $R'$, $G'$, $B'$. The workstation also allows for archival storage of the intermediary image data using any of a variety of archival storage writing devices 18, and media such as magnetic tape or disk, or optical disk. The workstation also enables the operator to modify (color and/or composition) the original image to construct the reproduced image. For that purpose, a video monitor 20, serves to display an image corresponding to an $R''$, $G''$, $B''$ image-bearing signal provided by the workstation. Control apparatus 22, which may include a keyboard and cursor, enables the operator to provide image manipulation commands pertinent to modifying the video image displayed and the reproduced image to be made or stored. An output device 24, which may be a film writer, thermal, ink-jet, electrostatic, or other type of printer, or electronic output device then receives $R'''$, $G'''$, $B'''$ image-bearing signals from the workstation for output onto the appropriate image-receptive medium, 26.

Figure 2:
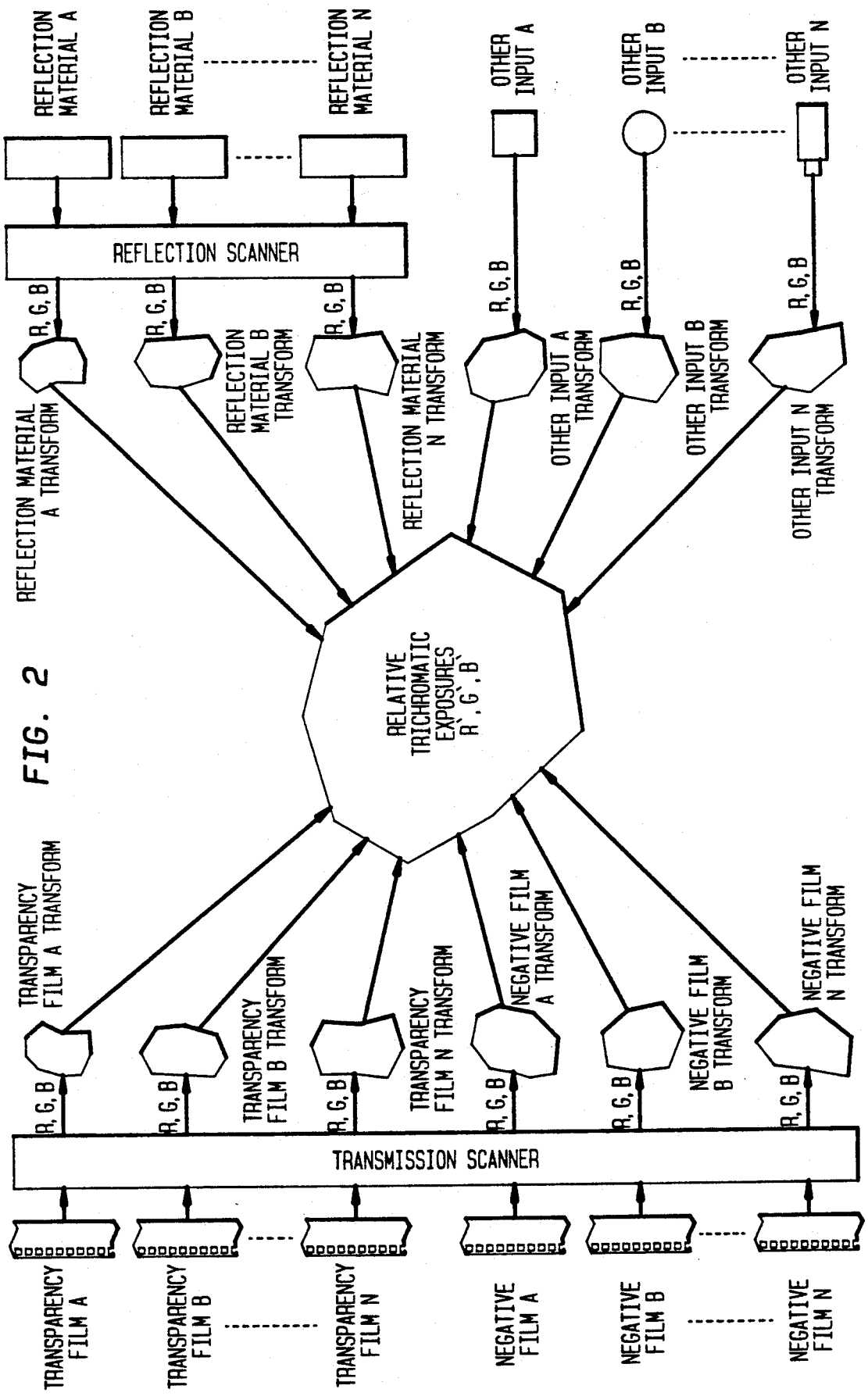
FIG. 2 is a diagrammatic illustration in accordance with the first preferred embodiment of the invention.

Referring to FIG. 2, in a first embodiment of the present invention, the objects of the invention are achieved by converting the R, G, B image-bearing signals, for example those produced by scanning an image from a negative or transparency film with a transmission scanner, to an image manipulation and/or storage metric approximating the relative trichromatic exposure values that each input film received when it captured the original scene.

Figure 3A:
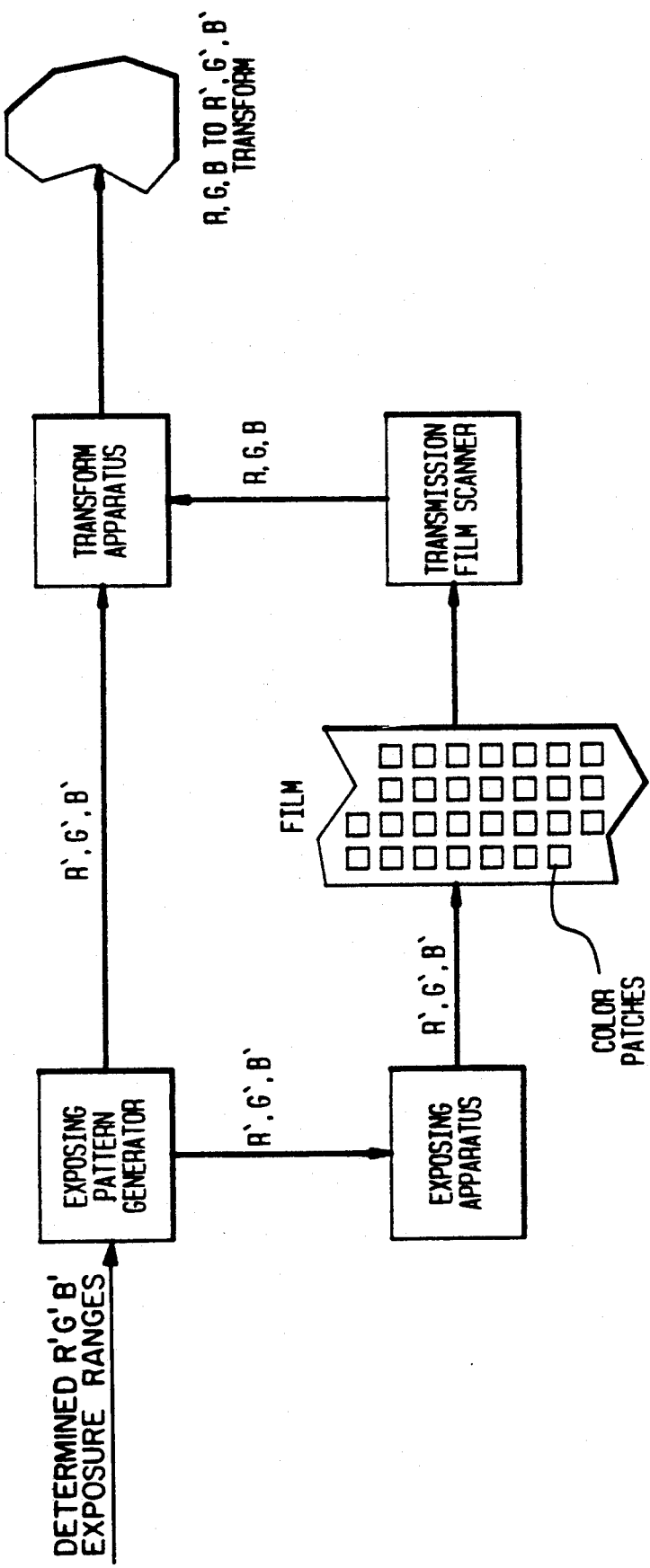

The present invention provides a method and means for generating a data-set from which the mathematical transformations to convert R, G, B image-bearing signals to relative trichromatic exposure values are derived. Referring to FIG. 3A, exposure patterns, chosen to adequately sample and cover the useful exposure range of the film being calibrated, are created by exposing pattern generator and are fed to exposing apparatus. Exposing apparatus produces known trichromatic exposures on said film to create test images consisting of approximately 400 color patches. Test images may be created using a variety of methods appropriate for the application. These methods include, but would not be limited to, using exposing apparatus such as a sensitometer, using the output device of a color imaging apparatus, or recording images of test objects of known reflectances illuminated by known light sources and calculating trichromatic exposure values using methods known in the photographic art. If input films of different speeds are used, the overall red, green and blue exposures must be properly adjusted for each film in order to compensate for the relative speed differences among the films. Each film thus receives equivalent exposures, appropriate for its red, green, and blue speeds. Exposed film is processed chemically. Film color patches are read by transmission scanner which produces R', G', B' image-bearing signals corresponding each color patch. Transform apparatus creates a transform relating the R, G, B image-bearing signal values for the film's test colors to the known R', G', B' exposures of the corresponding test colors.

Figure 3B:
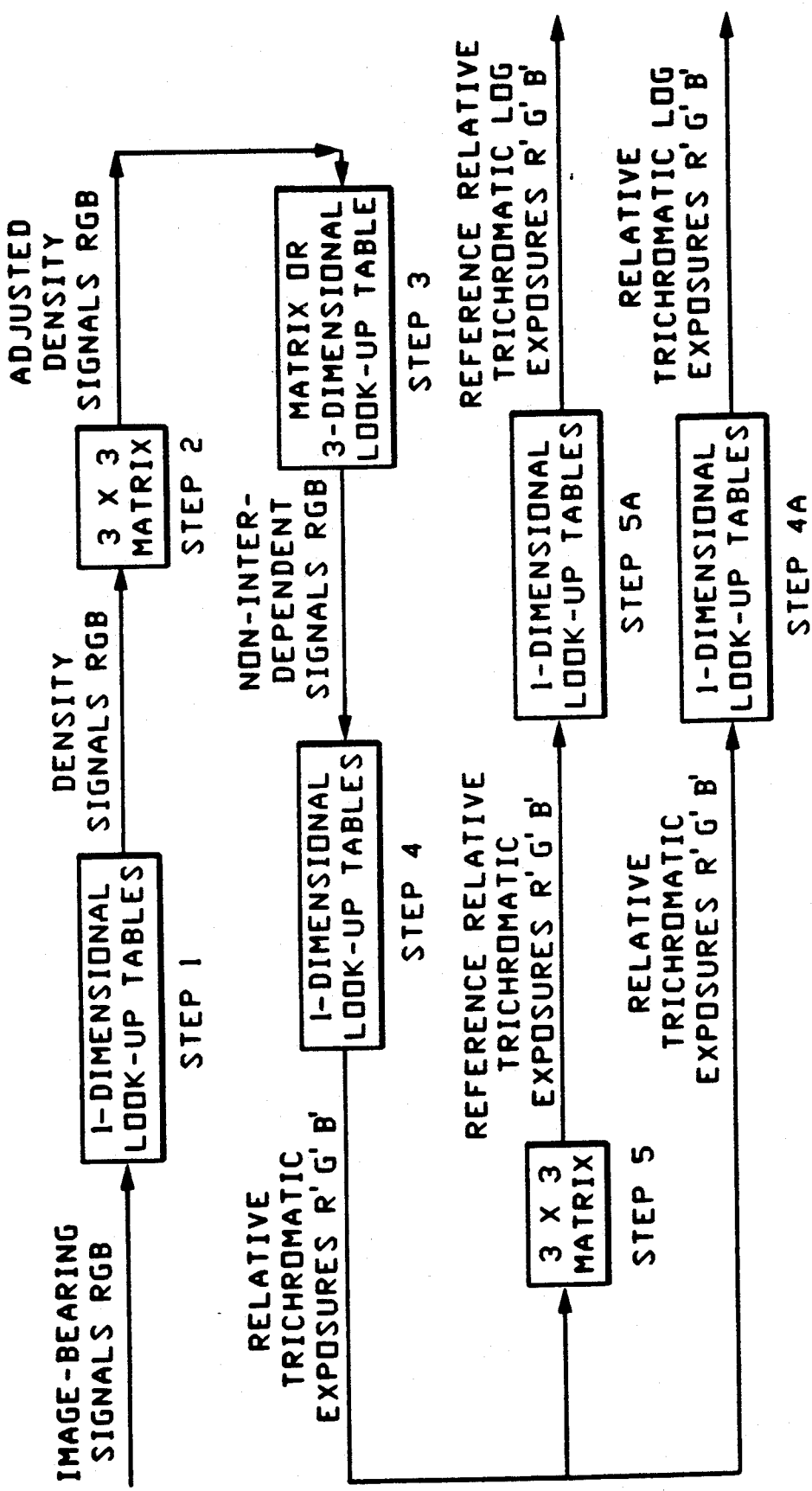

Referring to FIG. 3B, one method for performing the mathematical operations required to transform R, G, B image-bearing signals to the intermediary data metric of this preferred embodiment is as follows:

1) the R, G, B image-bearing signals, which correspond to the measured transmittances of the input film, are converted to RGB densities by using appropriate 1-dimensional look-up-tables (LUTs).
2) the RGB densities of step 1 are adjusted, by using a 3 by 3 matrix, to correct for differences among scanners in systems where multiple input scanners are used.
3) the RGB densities of step 2 are adjusted, by using another matrix operation or 3-dimensional LUT, to remove the interdependence of the image-bearing signals produced by the unwanted absorptions of the imaging dyes and inter-layer chemical interactions in the input film.
4) since the interdependencies of the three image-bearing signals have been removed, the RGB densities of step 3 may be individually transformed through appropriate 1-dimensional LUTS, derived such that the neutral scale densities of the input film are transformed to the neutral scale exposures of that film.
5) the RGB exposures of step 4 may be further transformed by another matrix operation to arrive at the R', G', B' exposures corresponding to those which a reference image-capturing device or medium would have received if it had captured the same original scene (FIG. 3C).

The image-bearing signals from each film processed according to the mathematical transformations developed from the calibration procedure described in this embodiment would yield, insofar as possible, identical intermediary data values, corresponding to relative R', G', B' exposure values, for captures of the same original exposures. It will be understood by those skilled in the art that this method may not completely correct for all differences in the spectral sensitivity characteristics of all image-capturing media and devices. Nevertheless, using the described image metric, images from any medium or device may be appropriately rendered on another medium or device without requiring documentation of their origins, images may also be stored for later use without requiring documentation of their origins, and images or portions thereof may be merged together to produce composite images of homogeneous and appropriate appearance.

In some applications, it may be desirable to retain certain individual film-to-film characteristic differences, such as contrast or color saturation, while still allowing for the interchange and mixing of intermediary image data. To that end, the R, G, B image-bearing signals from a transmission scanner are converted to an image manipulation and/or storage metric corresponding to the relative trichromatic exposure values of a reference image-capturing medium, of similar type to that which is being scanned.

Figure 4:
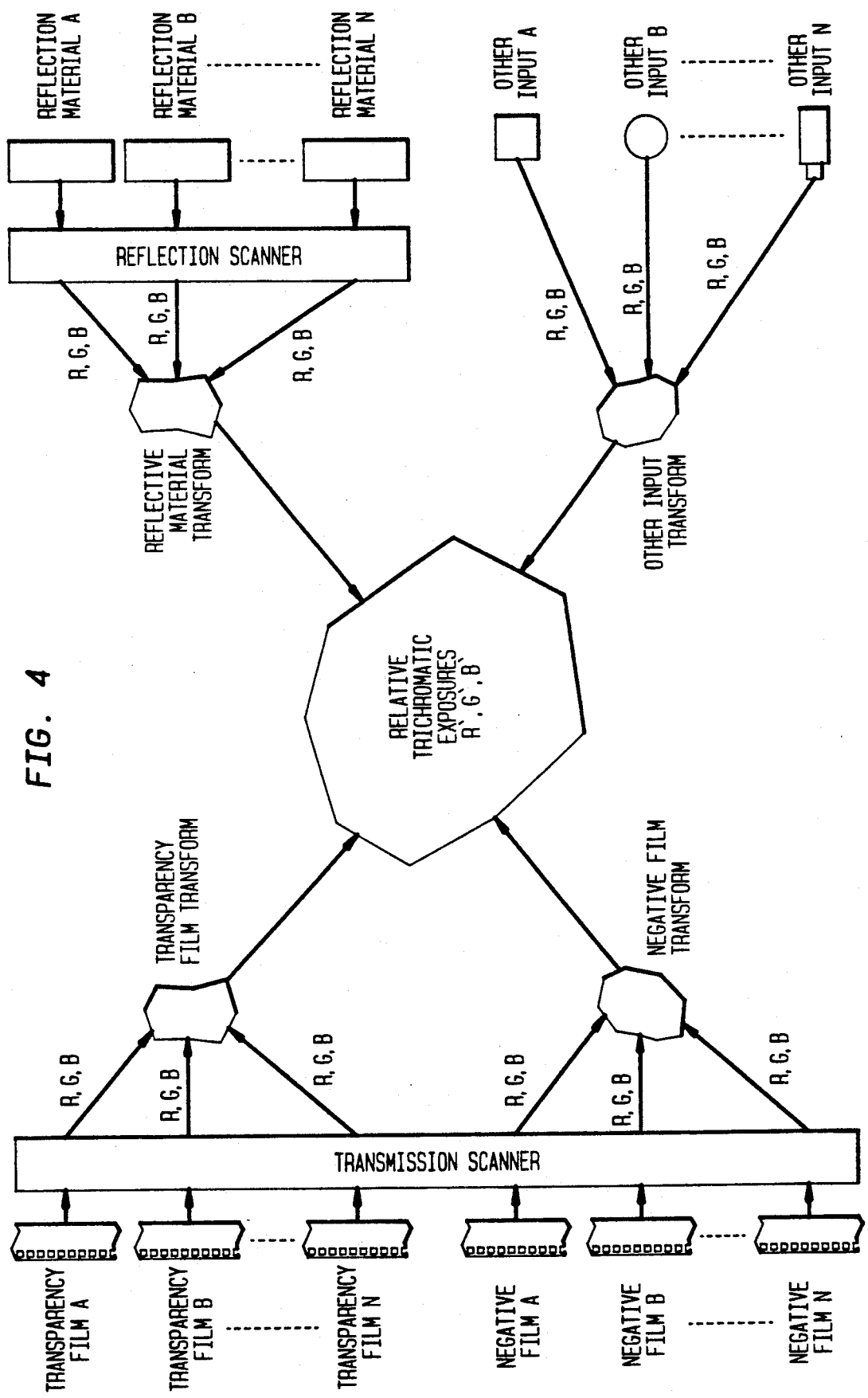
FIG. 4 is a diagrammatic illustration in accordance with a preferred embodiment of the invention.

Referring to FIG. 4, for example, a reference color negative film may be calibrated according to the method described in the previous embodiment, and the transformations so developed would be used for all other color negative films. Likewise, a reference color transparency film may be calibrated according to the method described in the previous embodiment, and the transformations so developed would be used for all other color Each reference film calibrated according to this procedure would yield, insofar as possible, identical intermediary data values, corresponding to relative R', G', B' exposure values for captures of the same original exposures. All other films would use the transformation of their corresponding reference film, and would yield, insofar as possible, relative R', G', B' exposure values differing from those of the reference film such that the color reproduction differences between a given film and its reference are maintained. For example, if both a high contrast and a low contrast negative captured the same scene, and were calibrated according to the previous procedure, identical intermediary data would result from both films. On the other hand if these same negatives were calibrated according to the present procedure, the range of intermediary image data values would be greater from the high contrast negative than from the low contrast negative, and thus the relative characteristic differences between the two films would be maintained in their respective intermediary image data. The methods for creating a transform relating the R, G, B image-bearing signal values for the reference films' test colors to the known R', G', B' exposures of the corresponding test colors and for performing the mathematical operations required to transform R, G, B image-bearing signals to the intermediary data m referred embodiment are the same as those of the previous procedure.

In these procedures, the relative trichromatic exposure values can be further converted by taking their logarithms (FIG. 3B). By so doing, adjustments for overall exposure and color balance can be accomplished by simple additions and subtractions to the relative log exposure values. In addition, the non-linear scaling of the logging operation generally provides for more efficient digital data storage.

Figure 5:
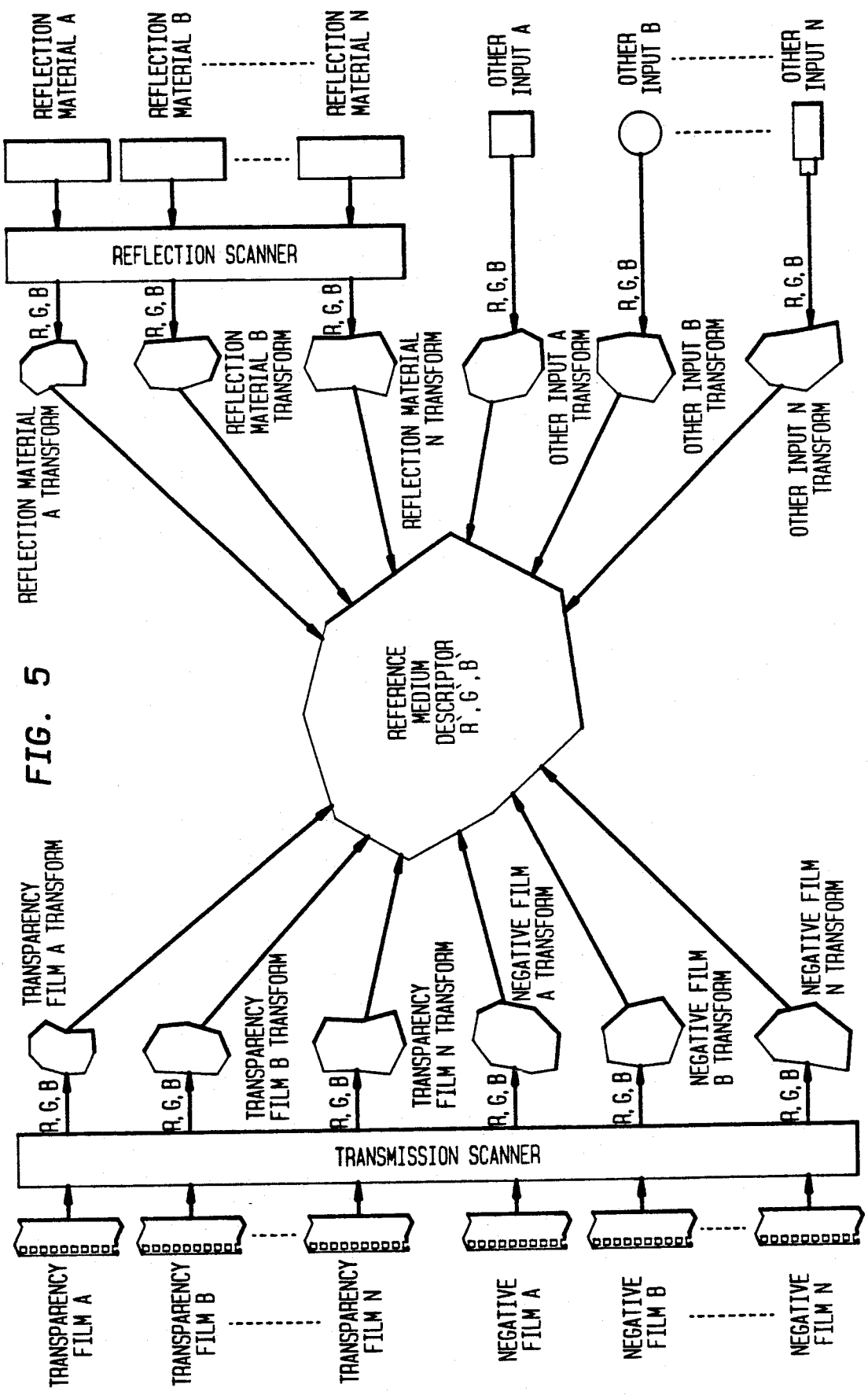
FIG. 5 is a diagrammatic illustration in accordance with a second preferred embodiment of the invention.

In a second preferred embodiment (FIG. 5), the present invention provides for a method and means to convert the R, G, B image-bearing signals from a transmission scanner to an image manipulation and/or storage metric which corresponds to a measurement or description of a single reference image-recording device and/or medium and in which the metric values for all input media correspond to the trichromatic values which would have been formed by the reference device or medium had it captured the original scene under the same conditions under which the input media captured that scene. For example, if the reference image recording medium was chosen to be a specific color transparency film, and the intermediary image data metric was chosen to be the measured RGB densities of that reference transparency film, then for an input color negative film, the R, G, B image-bearing signals from a scanner would be transformed to the R', G', B' density values corresponding to those of an image which would have been formed by the reference transparency film had it been exposed under the same conditions under which the color negative was exposed.

Figure 6A:
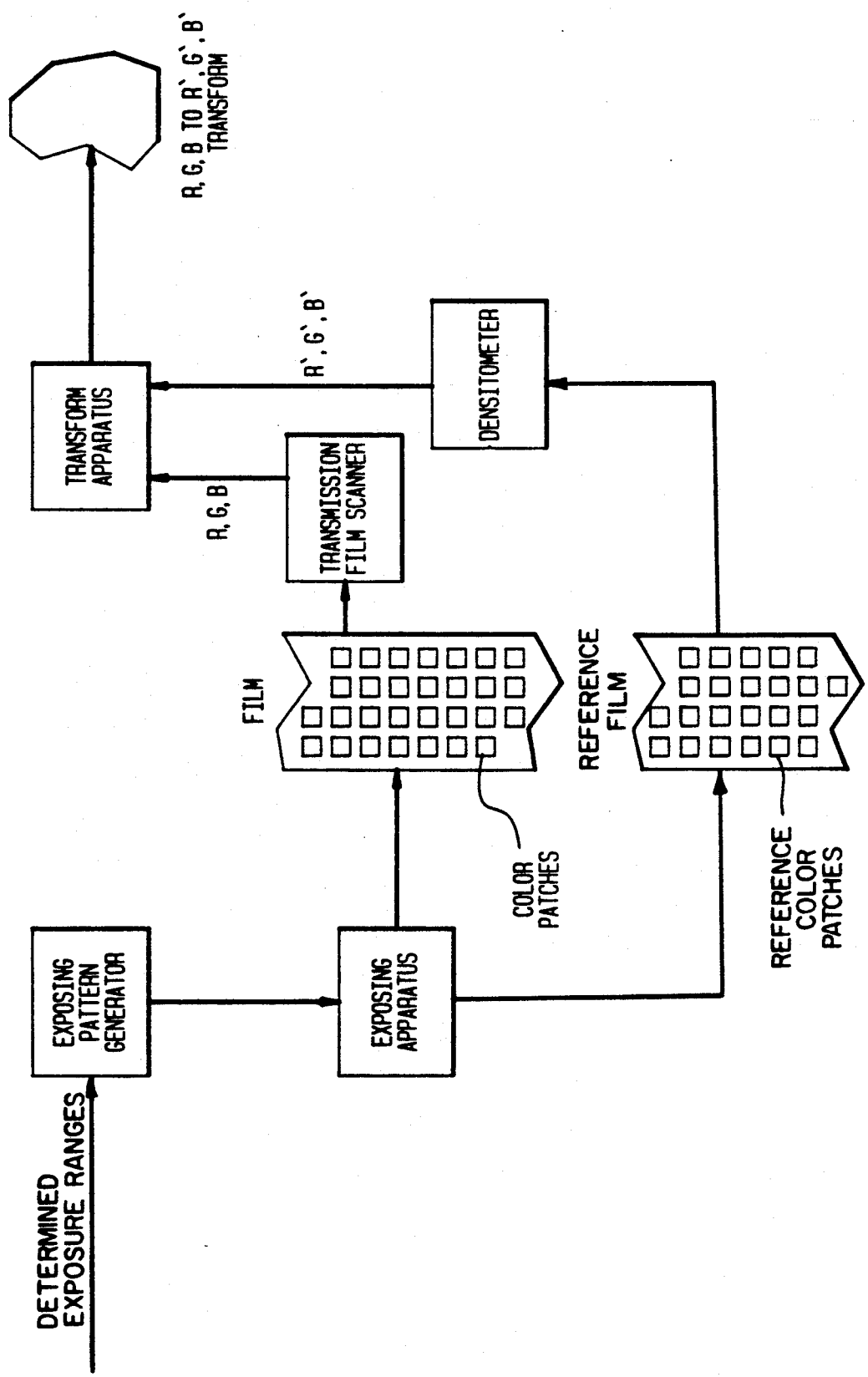
FIGS. 6A, 6B, and 6C, further illustrate in block diagram form variants of the second embodiment of the invention.

The present invention provides a method and means for generating a data-set from which the mathematical transformations to convert R, G, B image-bearing signals to trichromatic density values are derived. Referring to FIG. 6a, exposure patterns, chosen to adequately sample and cover the useful exposure range of the film being calibrated, are created by exposing pattern generator and are fed to exposing apparatus. Exposing apparatus produces trichromatic exposures on said film to create test images consisting of approximately 400 color patches. Test images may be created using a variety of methods appropriate for the application. These methods include, but would not be limited to, using exposing apparatus such as a sensitometer, using the output device of a color imaging apparatus, or recording images of test objects of known reflectances illuminated by known light sources and calculating trichromatic exposure values using methods known in the photographic art. If input films of different speeds are used, the overall red, green and blue exposures must be properly adjusted for each film in order to compensate for the relative speed differences among the films. Each film thus receives equivalent exposures, appropriate for its red, green, and blue speeds. Exposed film is processed chemically. Film color patches are read by transmission scanner which produces R, G, B image-bearing signals corresponding each color patch and by transmission densitometer which produces R', G', B' density values corresponding each color patch. Transform apparatus creates a transform relating the R, G, B image-bearing signal values for the film's test colors to the measured R', G', B' densities of the corresponding test colors of the reference transparency film.

Figure 7:
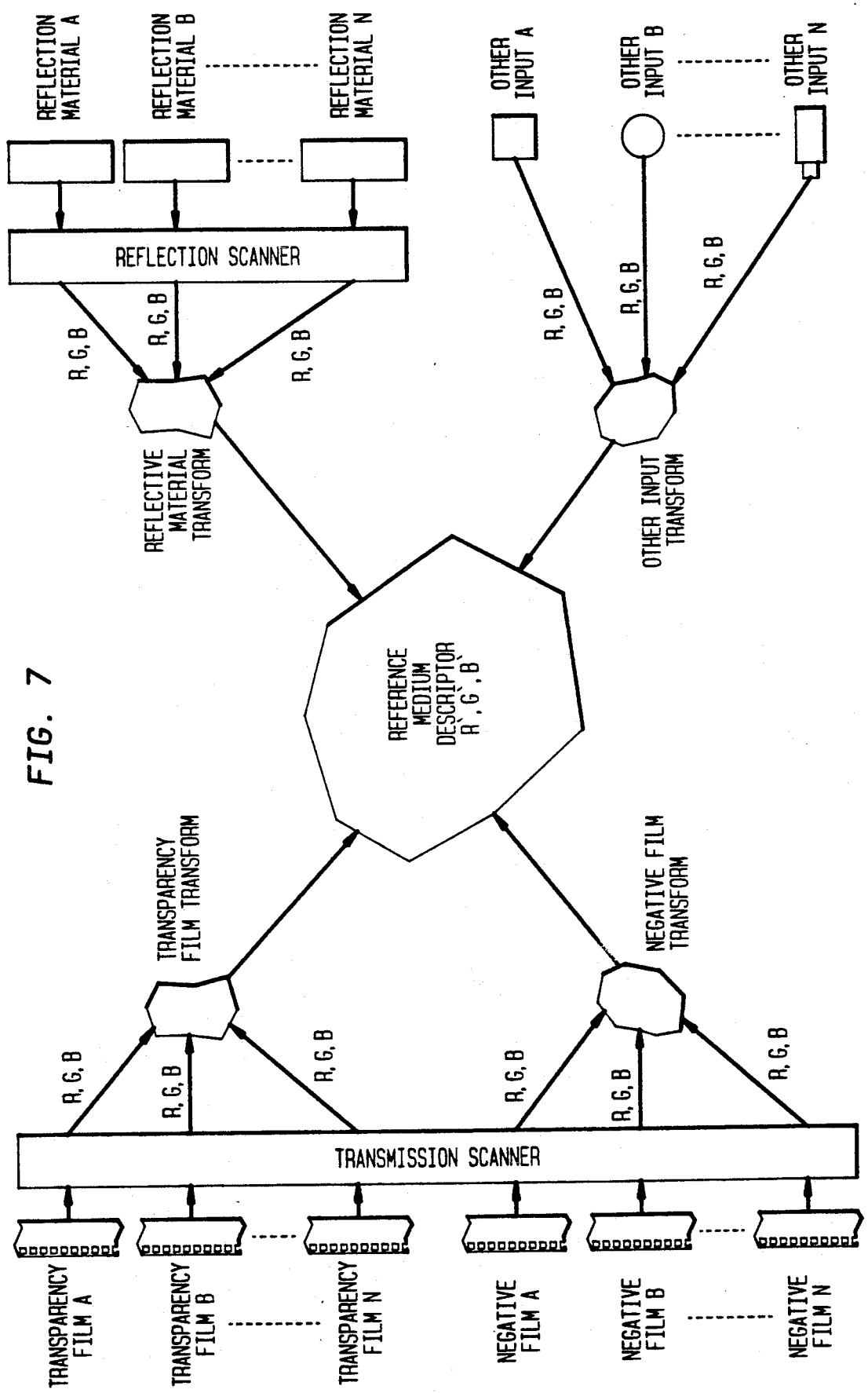
FIG. 7 is another diagrammatic illustration in accordance with the second embodiment of the invention.

Each input film calibrated according to the present invention would yield, insofar as possible, identical intermediary data values, corresponding to the RGB density values of the reference transparency film, for captures of the same original exposures. Uncalibrated films may also be used with transformations derived for similar types of films (FIG. 7), and the results would be similar to those described in the first embodiment.

Figure 6B:
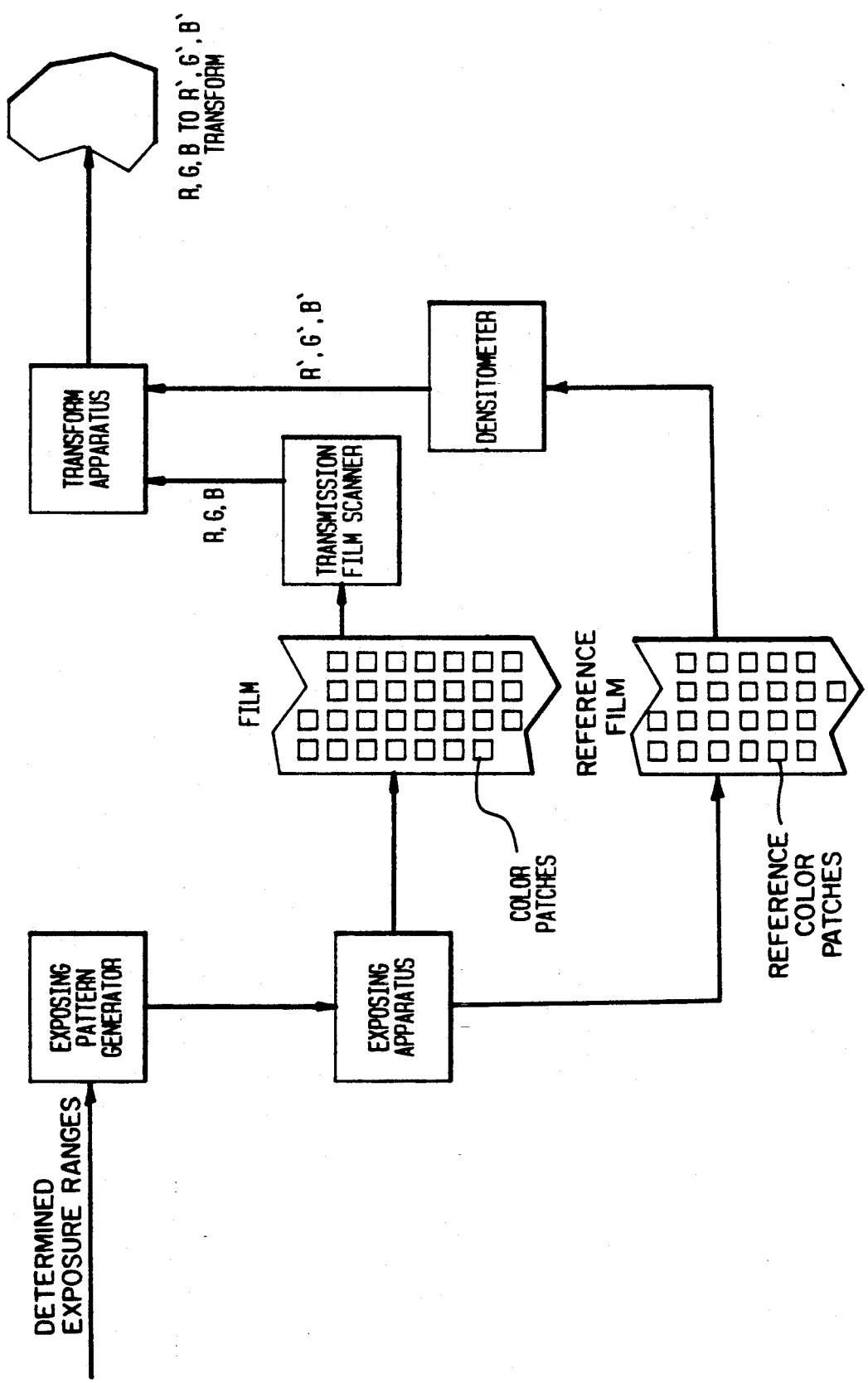
Figure 6C:
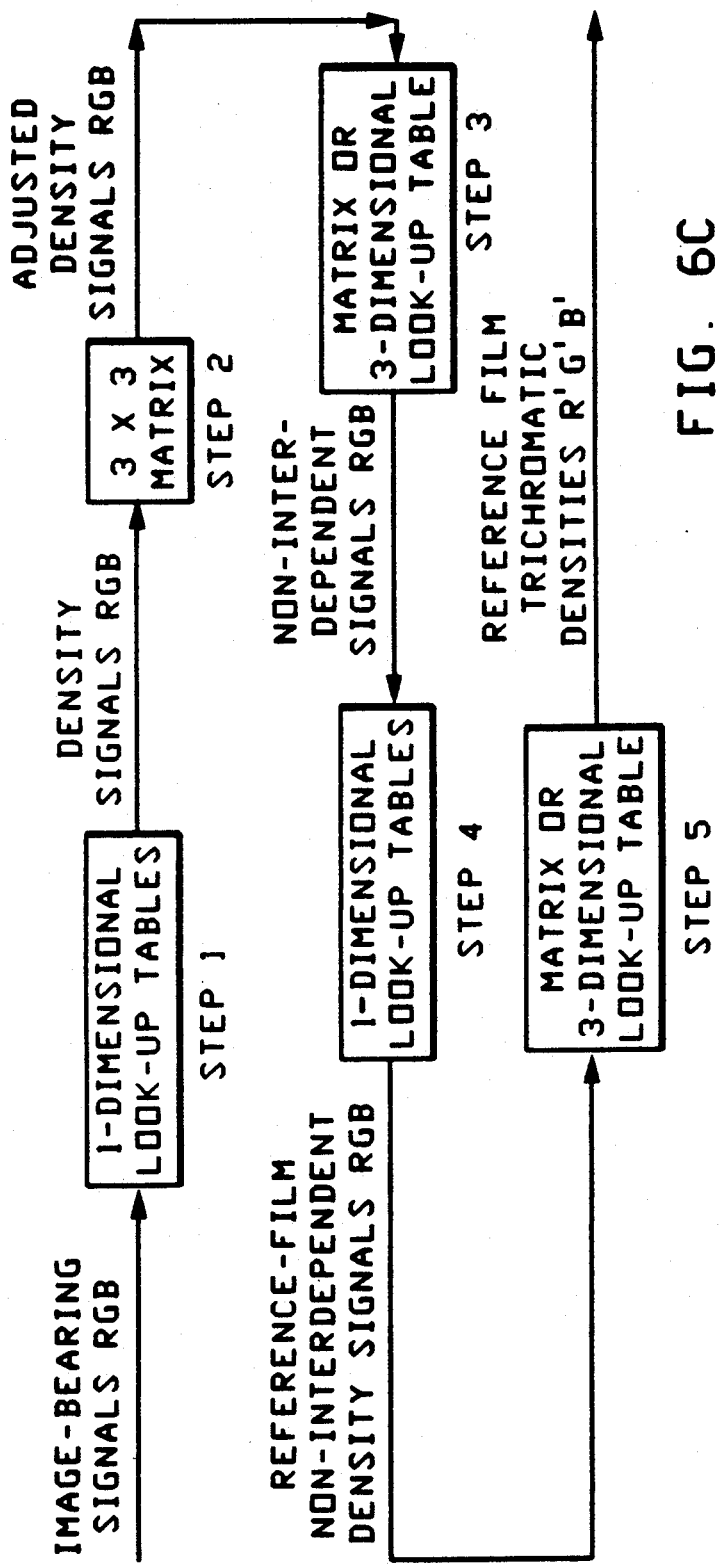

Referring to FIG. 6C, one method for performing the mathematical operations required to transform R, G, B image-bearing signals to the intermediary data metric of this preferred embodiment is as follows:

1) the R, G, B image-bearing signals, which correspond to the measured transmittances of the input film, are converted to RGB densities by using appropriate 1-dimensional LUTS.
2) the RGB densities of step 1 may be adjusted, by using a 3 by 3 matrix, to correct for differences among scanners in systems where multiple input scanners are used.
3) the RGB densities of step 2 are adjusted, by using another matrix operation or 3-dimensional LUT, to remove the interdependence of the image-bearing signals produced by the unwanted absorptions of the imaging dyes and inter-layer chemical interactions in the input film.
4) the RGB densities of step 3 are transformed through appropriate 1-dimensional LUTs, derived such that the neutral scale densities of the input film are transformed to the neutral scale densities of the reference film.
5) the RGB densities of step 4 are transformed through an appropriate matrix or 3-dimensional LUT to further transform the non-neutral densities of the input film to those of the reference film to form the R', G', B' values.

In this example, the chosen intermediary data metric corresponded to the RGB densities of the reference transparency film. In some applications, it may be advantageous to define the data metric so as to allow convenient manipulation of certain other types of imaging data. For example, if the metric values corresponded not to RGB densities but to colorimetric parameters related to hue, saturation and lightness, adjustments can be made directly to the intermediary image data to affect the corresponding perceived qualities of the image. In this case, these quantities could be measured for the test colors of the reference film by using spectrophotometric, spectroradiometric, or colorimetric measurements and colorimetric computations (FIG. 6b).

Figure 8:
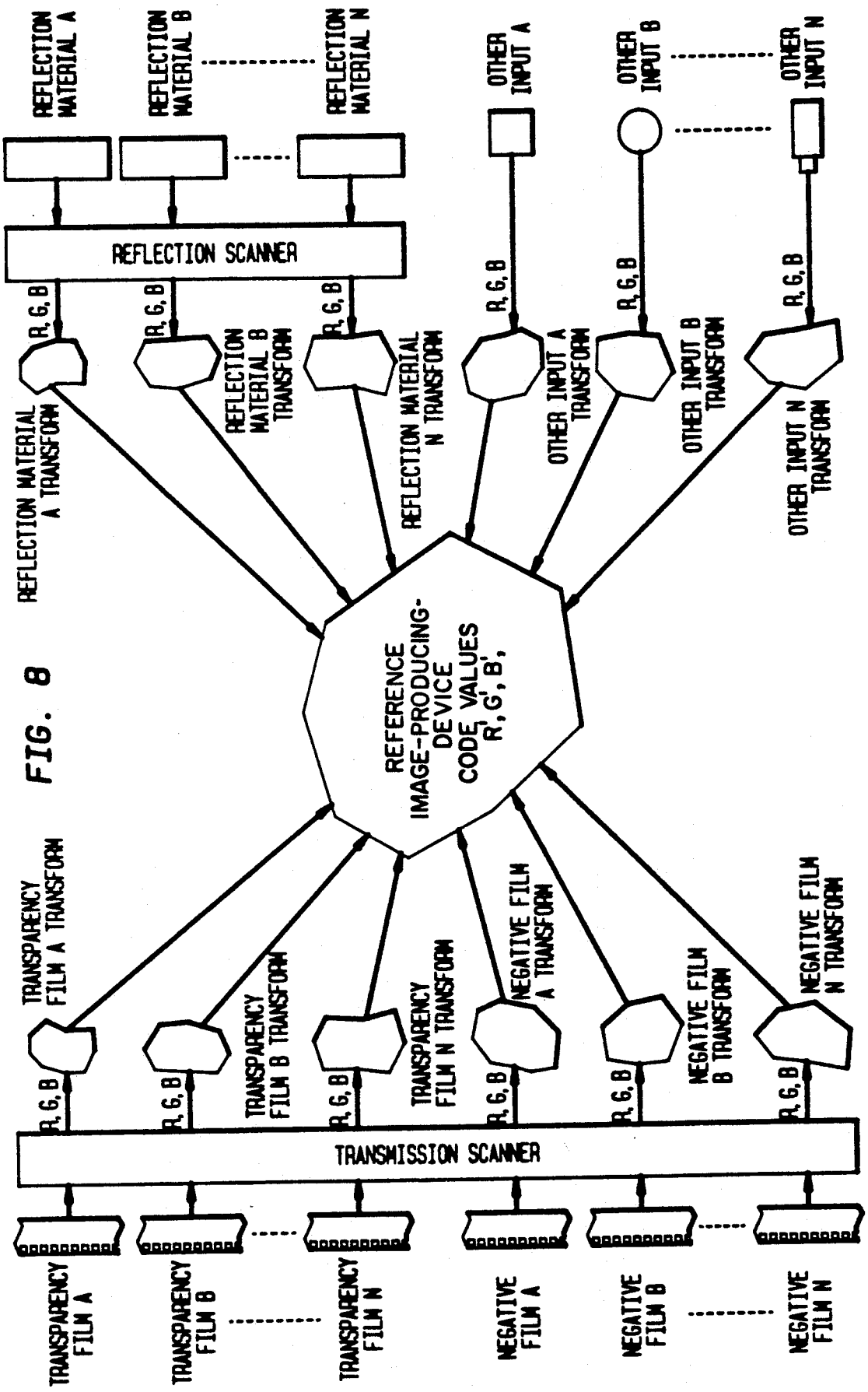
FIGS. 8, 9, and 10 are diagrammatic illustrations in accordance with a third preferred embodiment of the invention.

In a third preferred embodiment (FIG. 8), the present invention provides for a method and means to convert the R, G, B image-bearing signals from a transmission scanner to an image manipulation and/or storage metric which corresponds to the trichromatic signals of a reference image-producing device such as a film or paper writer, thermal printer, video display, etc., and in which the metric values correspond to those which would be required to appropriately reproduce the color image on that device. For example, if the reference image producing device was chosen to be a specific video display, and the intermediary image data metric was chosen to be the R', G', B' intensity modulating signals (code values) for that reference video display, then for an input film, the R, G, B image-bearing signals from a scanner would be transformed to the R', G', B' code values corresponding to those which would be required to appropriately reproduce the input image on the reference video display.

Figure 9:
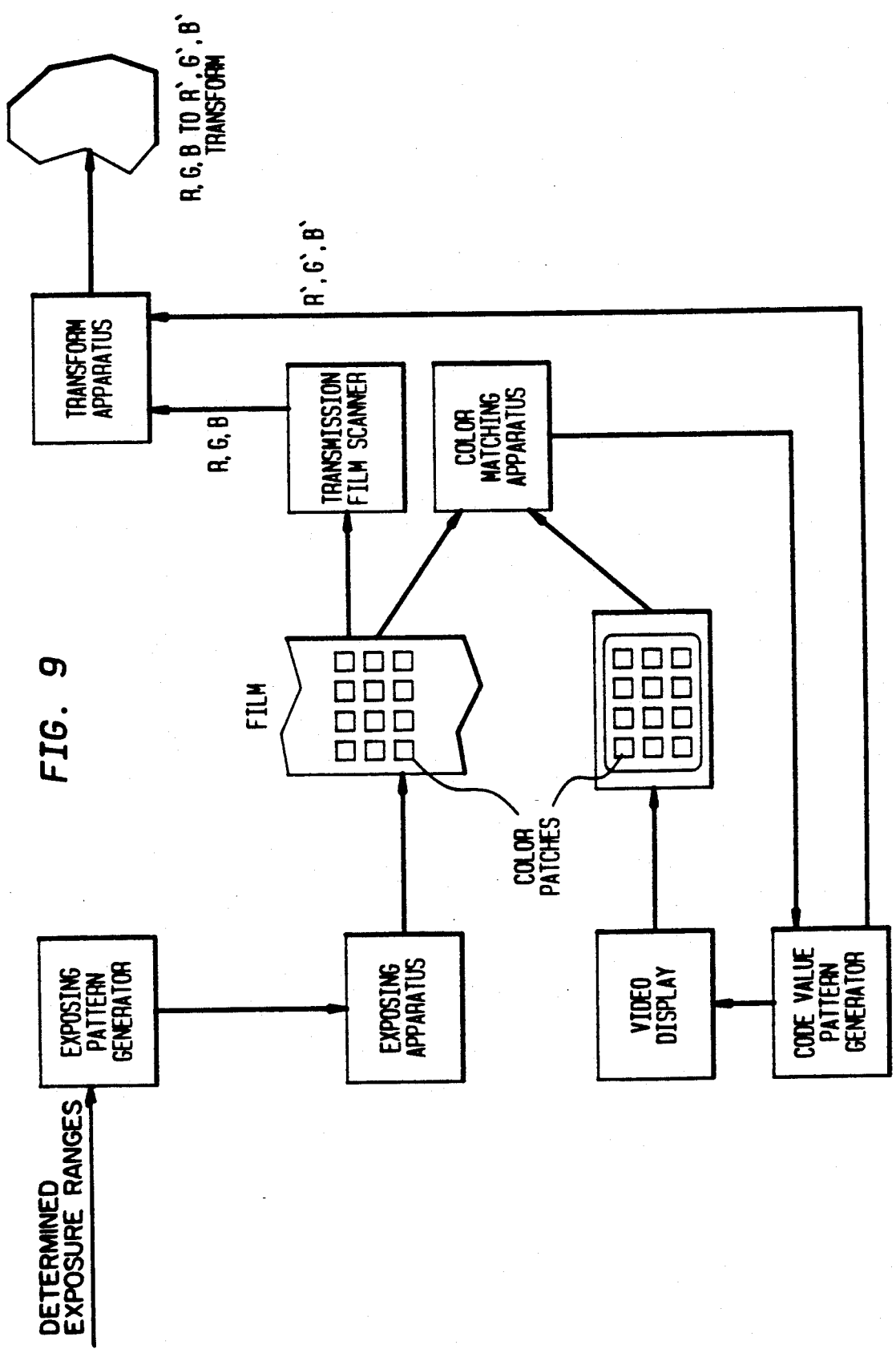

The present invention provides a method and means for generating a data-set from which the mathematical transformations to convert R, G, B image-bearing signals to the aforementioned code values are derived. Referring to FIG. 9, exposure patterns, chosen to adequately sample and cover the useful exposure range of the film being calibrated, are created by exposing pattern generator and are fed to exposing apparatus. Exposing apparatus produces trichromatic exposures on said film to create test images consisting of approximately 400 color patches. Test images may be created using a variety of methods appropriate for the application. These methods include, but would not be limited to: using exposing apparatus such as a sensitometer, using the output device of a color imaging apparatus recording images of test objects of known reflectances illuminated by known light sources, or calculating trichromatic exposure values using methods known in the photographic art. If input films of different speeds are used, the overall red, green and blue exposures must be properly adjusted for each film in order to compensate for the relative speed differences among the films. Each film thus receives equivalent exposures, appropriate for its red, green, and blue speeds. Exposed film is processed chemically. Film color patches are read by transmission scanner which produces R', G', B image-bearing signals corresponding each color patch. Signal-value patterns of code value pattern generator produces RGB intensity-modulating signals which are fed to the reference video display. The R', G', B' code values for each test color are adjusted such color matching apparatus, which may correspond to an instrument or a human observer, indicates that the video display test colors match the positive film test colors, or the colors of a printed negative. Transform apparatus creates a transform relating the R, G, B image-bearing signal values for the film's test colors to the R', G', B' code values of the corresponding test colors.

Figure 10:
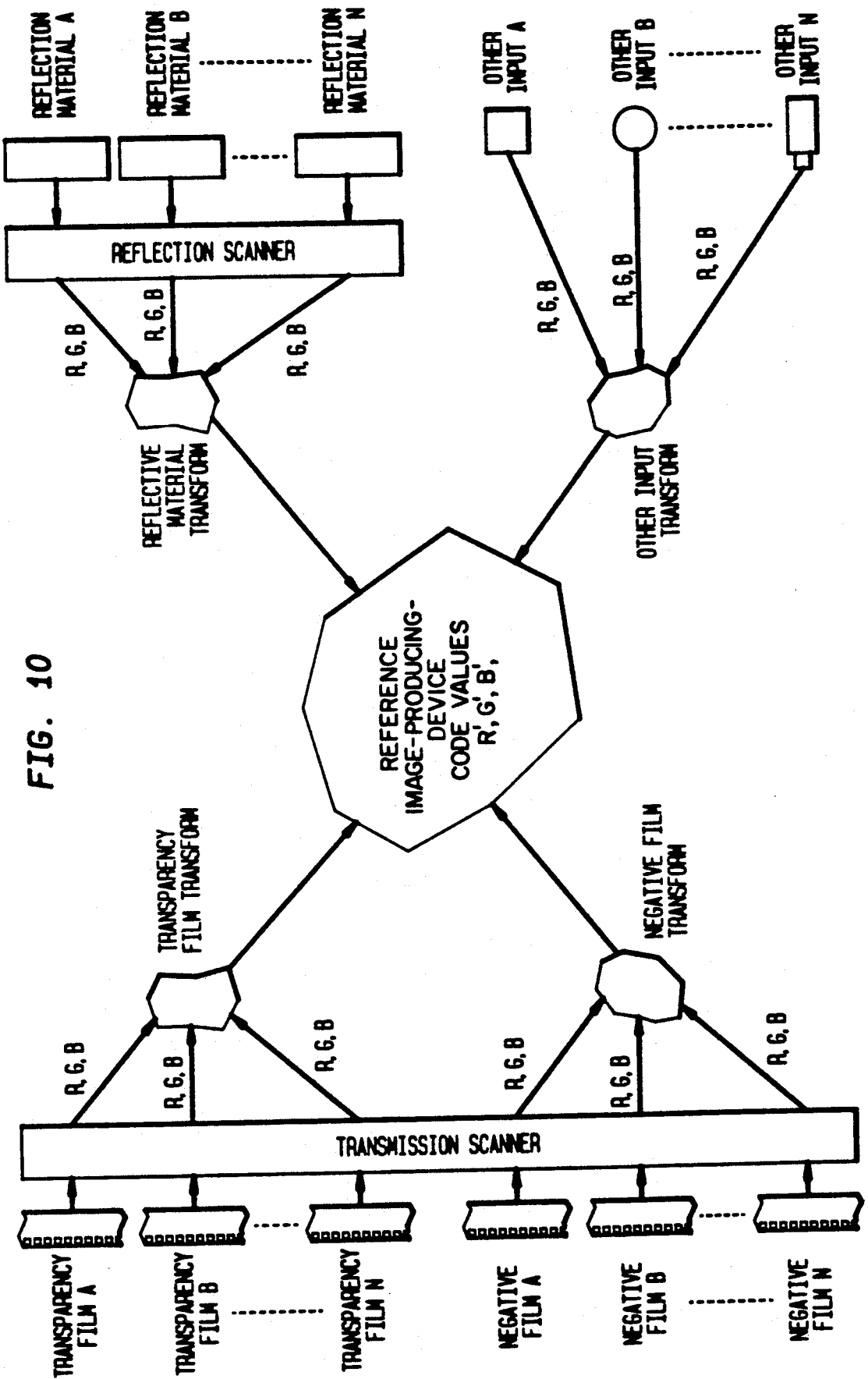

Each input film calibrated according to the present invention would yield, insofar as possible, intermediary data values corresponding to the R', G', B' code values required to appropriately reproduce the color image on the reference output device. Uncalibrated films may also be used with transformations derived for similar types of films, and the results would be similar to those described in the previous embodiment (FIG. 10).

Again, the mathematical operations required to transform R, G, B image-bearing signals to the intermediary data metric of this preferred embodiment may consist of a sequence of matrix operations and 1-dimensional LUTs similar to that described in the previous embodiments. Due to the complexity of these transformations, it should be noted that the transformation from R, G, B to R', G', B' may often be better accomplished by a 3-dimensional LUT. Such 3-dimensional LUTs may be developed according to the teachings of U.S. Pat. No. 4,941,039 entitled COLOR IMAGE REPRODUCTION APPARATUS HAVING A LEAST SQUARES LOOK UP TABLE AUGMENTED BY SMOOTHING filed in the name of J. D'Errico on Apr. 4, 1989.

The described intermediary image data from any of the described embodiments can be output to image-writing or image-forming devices, appropriately calibrated for the selected image metric, to render reproduced images on a plurality of media, the appearance of which will appropriately vary from one medium to another depending on their image reproduction characteristics. Such devices may be calibrated, for example, according to the teachings of U.S. patent application Ser. No. 388,451 entitled "A METHOD AND AN ASSOCIATED APPARATUS FOR CALIBRATING A COLOR DIGITAL HARDCOPY DEVICE" filed in the name of S. Johnson on Aug. 2, 1989. It will be understood by those skilled in the photographic art that such images will all appear aesthetically pleasing and appropriately rendered for the medium selected. For example, intermediary image data output onto color negative material will take advantage of that medium's long exposure range in a manner suited to subsequent printing of the negative onto a color print material. Likewise, intermediary image data output onto color transparency film will take advantage of that medium's color and tone scale characteristics in a manner suited to viewing the transparency either by backlighting or projection using devices manufactured specifically for those purposes.

The invention has been described in detail with reference to the figures; however, it will be appreciated that variations and modifications are possible within the spirit and scope of the invention.

What is claimed is:

1. A method for forming at least one transformation for transforming image-bearing signals derived from an image-capturing means to intermediary image-bearing signals which include image-capturing means' relative exposure values, said method comprising the steps of:
   a) determining an exposure range of said image-capturing means;
   b) specifying patterns of calibration exposures for producing image-capturing means' exposures which sample said exposure range of said image-capturing means;
   c) forming test images with said image-capturing means using said calibration exposures;
   d) sensing said test images and forming image-bearing signals; and
   e) forming at least one transformation by relating said image-bearing signals to corresponding said image-capturing means' relative exposure values.

2. The method according to claim 1 and further comprising the step of:
   f) applying said formed transformation to the image-bearing signals derived from the image-capturing means to form intermediary image-bearing signals which include relative exposure values.

3. The method of claim 1 or claim 2 wherein at least one set of transformations is formed for at least one of a plurality of image-capturing means and at least one set of said formed transformations is applied to the image-bearing signals of at least one image-capturing means.

4. A method for forming at least one transformation for transforming image-bearing signals derived from an image-capturing means to intermediary image-bearing signals which include relative exposure values for a reference image-capturing means, said method comprising the steps of:
   a) determining an exposure range of said image-capturing means;
   b) specifying patterns of calibration exposures for producing image-capturing means' exposures which sample said exposure range of said image-capturing means;
   c) determining reference image-capturing means exposures from said specified patterns of calibration exposures
   d) forming test images with said image-capturing means using said calibration exposures;
   e) sensing said test images and forming image-bearing signals; and
   f) forming at least one transformation by relating said image-bearing signals to corresponding said reference image-capturing means' relative exposure values.

5. The method according to claim 4 and further comprising the step of:
   g) applying said formed transformation to the image-bearing signals derived from the image-capturing means to form intermediary image-bearing signals which include reference image-capturing means' relative exposure values.

6. The method of claim 4 and claim 5 wherein at least one set of transformations is formed for at least one of a plurality of image-capturing means and at least one set of said formed transformations is applied to the image-bearing signals of at least one image-capturing means.

7. A method for forming at least one transformation for transforming image-bearing signals derived from an image-capturing means to intermediary image-bearing signals which include chromatic vales formed by a reference image-producing means, said method comprising the steps of:
 a) determining an exposure range of said image-capturing means;
 b) specifying patterns of calibration exposures for producing image-capturing means' exposures which sample said exposure range of said image-capturing means;
 c) forming test images with said image-capturing means using said calibration exposures;
 d) sensing said test images and forming image-bearing signals;
 e) forming reference images with said reference image-producing means using said calibration exposures;
 f) determining said chromatic values from said reference images; and
 g) forming at least one transformation by relating said image-bearing signals to corresponding said reference image-producing means' chromatic values.

8. The method according to claim 7 and further comprising the step of:
 h) applying said formed transformation to the image-bearing signals derived from the image-capturing means to form intermediary image-bearing signals which include chromatic values formed by a reference image-producing means.

9. The method of claim 7 or claim 8 wherein at least one set of transformations is formed for at least one of a plurality of image-capturing means and at least one set of said formed transformations is applied to the image-bearing signals of at least one image-capturing means.

10. A method for forming at least one transformation for transforming image-bearing signals derived from an image-capturing means to intermediary image-bearing signals which include chromatic signals for producing preferred color images on a reference image-producing means, said method comprising the steps of:
 a) determining an exposure range of said image-capturing means;
 b) specifying patterns of calibration exposures for producing image-capturing means' exposures which sample said exposure range of said image-capturing means;
 c) forming test images with said image-capturing means using said calibration exposures;
 d) sensing said test images and forming image-bearing signals;
 e) determining patterns of chromatic signal values, corresponding to patterns of said calibration exposures, which produce a preferred color image on said reference image-producing means; and
 f) forming at least one transformation by relating said image-bearing signals to corresponding said reference image-producing means' chromatic signal values.

11. The method according to claim 10 and further comprising the step of:
 g) applying said formed transformation to the image-bearing signals derived from the image-capturing means to form intermediary image-bearing signals which include chromatic signals for producing preferred color images on a reference image-producing means.

12. The method of claim 10 or claim 11 wherein at least one set of transformations is formed for at least one of a plurality of image-capturing means and at least one set of said formed transformations is applied to the image-bearing signals of at least one image-capturing means.

13. Apparatus for forming at least one transformation for transforming image-bearing signals derived from an image-capturing means to intermediary image-bearing signals which include image-capturing means' relative exposure values, comprising:
 a) means for determining an exposure range of said image-capturing means;
 b) means for specifying patterns of calibration exposures for producing image-capturing means' exposures which sample said exposure range of said image-capturing means;
 c) means for forming test images with said image-capturing means using said calibration exposures;
 d) means for sensing said test images and forming image-bearing signals; and
 e) means for forming at least one transformation by relating said image-bearing signals to corresponding said image-capturing means' relative exposure values.

14. The apparatus according to claim 13 and further comprising:
 f) means for applying said formed transformation to the image-bearing signals derived from the image-capturing means to form intermediary image-bearing signals which include relative exposure values.

15. The apparatus of claim 13 or claim 14 wherein at least one set of transformations is formed for each of a plurality of image-capturing means and at least one formed transformation is applied to at least one of the image-bearing signals.

16. Apparatus for forming at least one transformation for transforming image-bearing signals derived from an image-capturing means to intermediary image-bearing signals which include relative exposure values for a reference image-capturing means, comprising:
 a) means for determining an exposure range of said image-capturing means;
 b) means for specifying patterns of calibration exposures for producing image-capturing means' exposures which sample said exposure range of said image-capturing means;
 c) means for determining reference image-capturing means exposures from said specified patterns of calibration exposures
 d) means for forming test images with said image-capturing means using said calibration exposures;
 e) means for sensing said test images and forming image-bearing signals; and
 f) means for forming at least one transformation by relating said image-bearing signals to corresponding said reference image-capturing means' relative exposure values.

17. The Apparatus according to claim 16 and further comprising:
 g) means for applying said formed transformation to the image-bearing signals derived from the image-capturing means to form intermediary image-bearing signals which include reference image-capturing means' relative exposure values.

18. The apparatus according to claim 16 and claim 17 wherein at least one set of transformations is formed for each of a plurality of image-capturing means and at least one formed transformation is applied to at least one of the image-bearing signals.

19. Apparatus for forming at least one transformation for transforming image-bearing signals derived from an image-capturing means to intermediary image-bearing signals which include chromatic values formed by a reference image-producing means, comprising:
   a) means for determining an exposure range of said image-capturing means;
   b) means for specifying patterns of calibration exposures for producing image-capturing means' exposures which sample said exposure range of said image-capturing means;
   c) means for forming test images with said image-capturing means using said calibration exposures;
   d) means for sensing said test images and for forming image-bearing signals;
   e) means for forming reference images with said reference image-producing means using said calibration exposures;
   f) means for determining said chromatic values from said reference images; and
   g) means for forming at least one transformation by relating said image-bearing signals to corresponding said reference image-producing means' chromatic values.

20. The apparatus according to claim 19 and further comprising:
   h) means for applying said formed transformation to the image-bearing signals derived from the image-capturing means to form intermediary image-bearing signals which include chromatic values formed by a reference image-producing means.

21. Apparatus according to claim 19 or claim 20 wherein at least one set of transformations is formed for each of a plurality of image-capturing means and at least one formed transformation is applied to at least one of the image-bearing signals.

22. Apparatus for forming at least one transformation for transforming image-bearing signals derived from an image-capturing means to intermediary image-bearing signals which include chromatic signals for producing preferred color images on a reference image-producing means, comprising:
   a) means for determining an exposure range of said image-capturing means;
   b) means for specifying patterns of calibration exposures for producing image-capturing means' exposures which sample said exposure range of said image-capturing means;
   c) mean for forming test images with said image-capturing means using said calibration exposures;
   d) means for sensing said test images nd forming image-bearing signals;
   e) means for determining patterns of chromatic signal values, corresponding to patterns of said calibration exposures, which produce a preferred color image on said reference image-producing means; and
   f) means for forming at least one transformation by relating said image-bearing signals to corresponding said reference image-producing means' chromatic signal values.

23. Apparatus according to claim 22 and further comprising:
   g) means for applying said formed transformation to the image-bearing signals derived from the image-capturing means to form intermediary image-bearing signals which include chromatic signals for producing preferred color images on a reference image-producing means.

24. Apparatus according to claim 22 or claim 23 wherein at least one set of transformations is formed for each of a plurality of image-capturing means and at least one formed transformation is applied to at least one of the image-bearing signals.

25. A method for transforming scanner-generated image-bearing signals, produced by scanning an image-capturing means, intermediary image-bearing signals which include image-capturing means' relative exposure values, comprising the steps of:
   a) converting said scanner-generated image-bearing signals to scanner-density signals;
   b) forming adjusted density signals by correcting said scanner-density signals for differences among scanners;
   c) converting said adjusted density signals to independent signals by removing signal-interdependencies produced by image-capturing means' inter-layer chemical interactions and unwanted colorant absorptions by three-dimensional signal transformations; and
   d) converting said independent signals to intermediary image-bearing signals which includes said image-capturing means' relative exposure values.

26. A method for transforming scanner-generated image-bearing signals, produced by scanning an image-capturing means, to intermediary image-bearing signals which include relative exposure values, comprising the steps of:
   a) converting said scanner-generated image-bearing signals to scanner-density signals;
   b) forming adjusted density signals by correcting said scanner-density signals for differences among scanners;
   c) converting said adjusted density signals to independent signals by removing signal-interdependencies based on a similar image capturing means' inter-layer chemical interactions and unwanted colorant absorptions by three-dimensional signal transformations; and
   d) converting said independent signals to intermediary image-bearing signals which include relative exposure values based on a similar image capturing means' density to exposure characteristics.

27. The method according to claim 25 or 26 and further comprising the step of:
   e) further converting the intermediary image-bearing signals of step d) to include relative exposure values of a reference image-capturing means.

28. A method for transforming scanner-generated image-bearing signals, produced by scanning an image-capturing means, to intermediary image-bearing signals which include chromatic values of a reference image-capturing means comprising the steps of:
   a) converting said scanner-generated image-bearing signals to scanner-density signals;
   b) forming adjusted density signals by correcting said scanner-density signals for differences among scanners;
   c) converting said adjusted density signals to independent signals by removing signal-interdependencies produced by image-capturing means' inter-layer chemical interactions and unwanted colorant absorptions by three-dimensional signal transformations;

d) converting said independent signals to corresponding independent signals for said reference image-capturing means wherein neutral scale signals of said image-capturing means are converted to corresponding neutral scale signals of said reference image-capturing means; and
e) converting said independent signals for said reference image-capturing means to intermediary image-bearing signals which include chromatic values of said reference image-capturing means.

29. A method for transforming scanner-generated image-bearing signals, produced by scanning an image-capturing means, to intermediary image-bearing signals which include chromatic values of a reference image-capturing means comprising the steps of:
a) converting said scanner-generated image-bearing signals to scanner-density signals;
b) forming adjusted density signals by correcting said scanner-density signals for differences among scanners;
c) converting said adjusted density signals to independent signals by removing signal-interdependencies based on like image-capturing means' inter-layer chemical interactions and unwanted colorant absorptions by three-dimensional signal transformations;
d) converting said independent signals to corresponding independent signals for said reference image-capturing means based on conversion of neutral scale signals of like image-capturing means to corresponding neutral scale signals of said reference image-capturing means; and
e) converting said independent signals for said reference image-capturing means to intermediary image-bearing signals which include chromatic values of said reference image-capturing means.

30. Apparatus for transforming scanner-generated image-bearing signals, produced by scanning an image-capturing means, to intermediary image-bearing signals which include image-capturing means' relative exposure values, comprising:
a) means for converting said scanner-generated image-bearing signals to scanner-density signals;
b) means for forming adjusted density signals by correcting said scanner-density signals for differences among scanners;
c) removing means for converting said adjusted density signals to independent signals by removing signal-interdependencies produced by image-capturing means' inter-layer chemical interactions and unwanted colorant absorptions by three-dimensional signal transformations; and
d) means for converting said independent signals from said removing means to intermediary image-bearing signals which include said image-capturing means' relative exposure values.

31. Apparatus for transforming scanner-generated image-bearing signals, produced by scanning an image-capturing means, to intermediary image-bearing signals which include relative exposure values, comprising:
a) means for converting said scanner-generated image-bearing signals to scanner-density signals;
b) means for forming adjusted density signals by correcting said scanner-density signals for differences among scanners;
c) removing means for converting said adjusted density signals to independent signals by removing signal-interdependencies based on a similar image capturing means' inter-layer chemical interactions and unwanted colorant absorptions by three-dimensional signal transformations; and
d) means for converting said independent signals from said removing means to intermediary image-bearing signals which include relative exposure values based on a similar image capturing means' density to exposure characteristics.

32. The apparatus according to claim 30 or 31 and further comprising:
e) means for further converting said intermediary image-bearing signals to include relative exposure values of a reference image-capturing means.

33. Apparatus for transforming scanner-generated image-bearing signals, produced by scanning an image-capturing means, to intermediary image-bearing signals which include chromatic values of a reference image-capturing means comprising:
a) means for converting said scanner-generated image-bearing signals to scanner density signals;
b) means for forming adjusted density signals by correcting said scanner-density signals for differences among scanners;
c) removing means for converting said adjusted density signals to independent signals by removing signal-interdependencies produced by image-capturing means' inter-layer chemical interactions and unwanted colorant absorptions by three-dimensional signal transformations;
d) means for converting said independent signals to corresponding independent signals for said reference image-capturing means wherein neutral scale signals of said image-capturing means are converted to corresponding neutral scale signals of said reference image-capturing means; and
e) means for converting said independent signals for said reference image-capturing means to intermediary image-bearing signals which include chromatic values of said reference image-capturing means.

34. Apparatus for transforming scanner-generated image-bearing signals, produced by scanning an image-capturing means, to intermediary image-bearing signals which include chromatic values of a reference image-capturing means comprising:
a) means for converting said scanner-generated image-bearing signals to scanner-density signals;
b) means for forming adjusted density signals by correcting said scanner-density signals for differences among scanners;
c) removing means for converting said adjusted density signals to independent signals by removing signal-interdependencies based on like image-capturing means' inter-layer chemical interactions and unwanted colorant absorptions by three-dimensional signal transformations;
d) means for converting said independent signals to corresponding independent signals for said reference image-capturing means based on conversion of neutral scale signals of like image-capturing means to corresponding neutral scale signals of said reference image-capturing means; and
e) means for converting said independent signals for said reference image-capturing means to intermediary image-bearing signals which include chromatic values of said reference image-capturing means.

* * * * *

UNITED STATES PATENT AND TRADEMARK OFFICE
CERTIFICATE OF CORRECTION

PATENT NO. : 5,267,030

DATED : November 30, 1993

INVENTOR(S) : Edward J. Giorgianni, Thomas E. Madden

It is certified that error appears in the above-indentified patent and that said Letters Patent is hereby corrected as shown below:

Column 1, Line 16, delete "4,958,200" and insert therefor --4,958,220--.

Column 1, Line 20, delete "filed in the P. Allessi et al on De." and insert therefor --filed in the names of P. Alessi et al on Dec.--.

Column 8, Line 21, after "other color" add -- transparency films.--.

Column 8, Line 46-47, delete "m referred" and insert therefor --metric of this preferred--.

UNITED STATES PATENT AND TRADEMARK OFFICE
CERTIFICATE OF CORRECTION

PATENT NO. : 5,267,030
DATED : November 30, 1993
INVENTOR(S) : Edward J. Giorgianni, Thomas E. Madden It is certified that error appears in the above-indentified patent and that said Letters Patent is hereby corrected as shown below:

Column 13, Line 4, delete "vales" and insert therfor --values--.

Column 14, Line 66, delete "and" and insert therefor --or-.

Column 15, Line 53, delete "nd" and insert therefor --and--.

Column 16, Line 11, after "means," add --to--.

Signed and Sealed this

Fourth Day of April, 1995

Attest:

BRUCE LEHMAN

Attesting Officer

Commissioner of Patents and Trademarks